US006536672B1

(12) United States Patent
Outwater

(10) Patent No.: US 6,536,672 B1
(45) Date of Patent: Mar. 25, 2003

(54) PRODUCT AUTHENTICATION SYSTEM AND METHOD

(75) Inventor: Chris Outwater, Santa Barbara, CA (US)

(73) Assignee: DNA Technologies, Inc., Halifax (CA)

( * ) Notice: Subject to any disclaimer, the term of this patent is extended or adjusted under 35 U.S.C. 154(b) by 0 days.

(21) Appl. No.: 09/291,365

(22) Filed: Apr. 14, 1999

Related U.S. Application Data

(60) Provisional application No. 60/108,956, filed on Sep. 18, 1998.

(51) Int. Cl.$^{7}$ .......................... G06K 19/06; G06K 7/10

(52) U.S. Cl. ....................................... 235/491; 235/468

(58) Field of Search ................................ 235/487, 491, 235/468, 494, 462.01, 462.04, 469; 283/88, 89

(56) References Cited

U.S. PATENT DOCUMENTS

| | | | | |
|---|---|---|---|---|
| 3,500,047 A | | 3/1970 | Berry | 250/271 |
| 3,654,463 A | * | 4/1972 | Geusic et al. | 250/458.1 |
| 3,858,977 A | | 1/1975 | Baird | 356/71 |
| 3,891,829 A | | 6/1975 | Dobras | 235/462.04 |
| 3,922,090 A | | 11/1975 | Fain | 356/71 |
| 4,037,929 A | | 7/1977 | Bricot et al. | 349/200 |
| 4,165,002 A | | 8/1979 | Meagher | 206/424 |
| 4,186,020 A | | 1/1980 | Wachtel | 523/161 |
| 4,190,330 A | | 2/1980 | Berreman | 349/200 |
| 4,387,112 A | | 6/1983 | Blach | 427/7 |
| 4,442,170 A | | 4/1984 | Kaule et al. | 428/333 |
| 4,452,843 A | | 6/1984 | Kaule et al. | 428/199 |
| 4,497,248 A | | 2/1985 | Kanzelberger et al. | 104/27 |
| 4,572,616 A | | 2/1986 | Kowel et al. | 349/200 |
| 4,598,205 A | | 7/1986 | Kaule et al. | 250/458.1 |
| 4,876,000 A | * | 10/1989 | Mikhail | 209/584 |
| 4,882,195 A | | 11/1989 | Butland | 427/1 |
| 4,884,828 A | | 12/1989 | Burnham et al. | 283/89 |
| 4,889,367 A | | 12/1989 | Miller | 283/88 |
| 4,927,180 A | | 5/1990 | Trundle et al. | 283/70 |
| 4,983,817 A | | 1/1991 | Dolash et al. | 235/462.04 |
| 4,989,958 A | | 2/1991 | Hamada et al. | 359/666 |
| 5,083,814 A | | 1/1992 | Guinta et al. | 283/70 |
| 5,106,125 A | | 4/1992 | Antes | 283/91 |
| 5,130,839 A | | 7/1992 | Tomita | 359/205 |
| 5,139,812 A | | 8/1992 | Lebacq | 427/7 |
| 5,169,155 A | * | 12/1992 | Soules et al. | 273/293 |
| 5,169,222 A | * | 12/1992 | Bollore et al. | 312/328 |

(List continued on next page.)

OTHER PUBLICATIONS

PCT/US001/13005 transmitted Jul. 21, 2000.

*Primary Examiner*—Thien M. Le
*Assistant Examiner*—Jamara A Franklin
(74) *Attorney, Agent, or Firm*—Jerry Cohen

(57) ABSTRACT

A product authentication system and method employs a unique mark that is simple and cost-effective to apply, but provides several layers of protection, including anti-counterfeit and anti-diversion, against counterfeiters. The unique mark contains a product control code that is printed in invisible ink comprising a UV ink and an IR ink. The first layer of protection is invisibility. The second layer of protection is the code itself. The third layer of protection is the presence of the IR ink in the invisible code. The fourth layer of protection is the IR emitting characteristics of the invisible code.

20 Claims, 4 Drawing Sheets

U.S. PATENT DOCUMENTS 5,172,937 A 12/1992 Sachetti ...................... 504/213
5,194,289 A 3/1993 Butland ......................... 427/1
5,206,490 A 4/1993 Petigrew et al. ............ 347/100
5,210,411 A * 5/1993 Oshima et al. ............. 250/271
5,271,645 A 12/1993 Wicker ........................ 283/92
5,294,784 A 3/1994 Tooley et al. .......... 235/462.15
5,306,899 A 4/1994 Marom et al. .............. 235/382
5,331,140 A 7/1994 Stephany ............... 235/462.06
5,360,628 A 11/1994 Butland ......................... 427/7
5,401,960 A 3/1995 Fisun et al. ................. 250/271
5,412,492 A 5/1995 Zammit et al. ................ 349/1
5,413,841 A 5/1995 Mahn, Sr. et al. .......... 428/195
5,446,267 A 8/1995 Stanzani et al. ............ 235/440
5,447,335 A * 9/1995 Haslop ........................ 283/91
5,483,363 A * 1/1996 Holmes et al. ................ 359/2
5,493,427 A 2/1996 Nomura et al. ................ 349/5
5,502,304 A 3/1996 Berson et al. .............. 250/271
5,514,860 A 5/1996 Berson ....................... 235/468
5,525,380 A 6/1996 Paz-Pujalt et al. .......... 427/585
5,525,798 A 6/1996 Berson et al. .............. 250/271
5,542,971 A 8/1996 Auslander et al. ....... 106/31.15
5,569,317 A 10/1996 Sarada et al. ............... 524/111
5,583,489 A 12/1996 Loemker et al. ......... 340/572.8
5,599,578 A 2/1997 Butland ......................... 427/7
5,611,958 A 3/1997 Takeuchi et al. ............ 252/301
5,612,529 A 3/1997 Coleman .................... 235/455
5,634,731 A * 6/1997 Kita et al. ............. 400/120.18
5,667,317 A 9/1997 Tan ............................ 400/197
5,672,465 A 9/1997 Patel et al. ................. 430/332
5,674,698 A 10/1997 Zarling et al. ............. 435/7.92
5,684,548 A 11/1997 Ariki et al. ................... 349/57
5,698,397 A 12/1997 Zarling et al. ................. 435/6
5,701,538 A 12/1997 Yasui ......................... 396/512
5,712,721 A 1/1998 Large ......................... 349/245
5,736,410 A * 4/1998 Zarling et al. .............. 436/172
5,766,324 A 6/1998 Ikegaya et al. .......... 106/31.15
5,773,808 A 6/1998 Laser .................... 235/462.42
5,815,193 A * 9/1998 Clevinger ................... 347/222
5,867,586 A 2/1999 Liang ......................... 382/112
5,895,073 A 4/1999 Moore ......................... 283/70
5,909,176 A * 6/1999 Schrott et al. ........... 340/572.1
5,917,925 A * 6/1999 Moore ........................ 382/101
5,959,296 A 9/1999 Cyr et al. ................... 250/271
5,978,118 A 11/1999 Flaherty ..................... 359/127
6,028,306 A 2/2000 Hayashi ...................... 250/235
6,039,257 A * 3/2000 Berson et al. .............. 235/468
6,106,110 A * 8/2000 Gundjian et al. ............. 347/86
6,114,704 A * 9/2000 Buck .......................... 250/372

* cited by examiner

PRODUCT AUTHENTICATION SYSTEM AND METHOD

REFERENCE TO PROVISIONAL APPLICATION

This application claims the benefit of U.S. Provisional Application No. 60/108,956, filed Nov. 18, 1998.

BACKGROUND OF THE INVENTION

1. Field of the Invention

The invention relates generally to a product authentication system and method and, more particularly, a product authentication system and method in which an authentication or security mark comprising a code that is not visible under visible light is applied on a product label.

2. Description of the Related Art

Various techniques have been used to identify articles in an effort to reduce counterfeiting. For collectibles such as art works and sports memorabilia, where a single item may be worth millions of dollars, a technique that is highly refined and virtually impossible to copy is desired. This is because high potential counterfeiting gains will motivate counterfeiters to invest large sums of money and resources to defeat the anti-counterfeit measure. Similarly, the high cost of implementing an anti-counterfeit measure for collectibles is typically accepted by the owner or insurer, because the potential loss from counterfeiting is great.

On the other hand, for mass produced items such as apparel, CDs, and audio and video cassettes, cost is a more important factor in implementing an anti-counterfeit measure. The implementation cost must be small enough so that the cost of the protected product will not increase dramatically. Yet, the anti-counterfeit measure must be refined enough so that counterfeiters will be unable to defeat the anti-counterfeit measure in a sufficiently easy manner such that they will be able to economically produce and sell counterfeit goods.

Mass produced items also have to be protected against product diversion. Product diversion occurs when a counterfeiter acquires genuine, non-counterfeit goods that are targeted for one market and sells them in a different market. The counterfeiter does this to circumvent the manufacturer's goal of controlling the supply of his or her goods in a particular market and, as a consequence, benefits from the sales in that limited supply market or in the diverted sales market.

In one type of anti-counterfeit and anti-diversion measure, an ultraviolet (UV) ink is used to mark the product with an identifying indicia. One benefit of using the UV ink is that it is typically not visible when illuminated with light in the visible spectrum (380–770 nm), but is visible when illuminated with light in the UV spectrum (200–380 nm). Therefore, counterfeiters will be unable to tell whether the product contains a security mark by merely looking at the product when the product is illuminated with visible light.

A number of UV inks are readily available in the security industry and can be obtained at a relatively low cost. Several UV ink types and compositions are described, for example, in U.S. Pat. No. 5,569,317, entitled "Fluorescent and Phosphorescent Tagged Ink for Indicia" the disclosure of which is incorporated by reference herein. This patent discloses a security mark that becomes visible when illuminated with UV light having a wavelength of 254 nm.

However, the use of security marks containing a UV ink has seen increased use and counterfeiters have become knowledgeable about their use. It has been a common practice for counterfeiters to examine the UV ink from a product sample, reproduce or procure the same or similar UV ink that matches the characteristics of the UV ink from the product sample, and apply the same security mark on the counterfeit products using the substitute UV ink.

In another type of anti-counterfeit and anti-diversion measure, an infrared (IR) ink is used to mark the product with an identifying indicia. As with the UV ink, one benefit of using the IR ink is that it is typically not visible when illuminated with light in the visible spectrum, but is visible when illuminated with light in the IR spectrum (800–1600 nm). An additional benefit of using the IR ink is that it is more difficult to reproduce or procure the matching IR ink by studying a product sample containing the IR security mark. Examples of IR security mark usage are given in U.S. Pat. Nos. 5,611,958 and 5,766,324. The disclosures of these patents are incorporated by reference herein.

Widespread use of IR security marks have been limited, however, because of cost. Up-converting phosphors that are contained in IR inks are generally more expensive and less readily available than down-converting phosphors that are contained in many UV inks.

Biologic security marks have also been used to combat counterfeiting and product diversion, but their use have also been limited due to cost.

Combination security marks have also been proposed. In U.S. Pat. Nos. 5,360,628 and 5,360,628, the disclosures of both of which are incorporated by reference herein, a security mark comprising a visible component and an invisible component made up of a combination of a UV dye and a biologic marker, or a combination of an IR dye and a biologic marker is proposed. Also, in U.S. Pat. No. 5,698, 397, the disclosure of which is incorporated by reference herein, a security mark containing two different types of up-converting phosphors is proposed.

SUMMARY OF THE INVENTION

An object of this invention is to provide a product authentication system and method employing a unique mark that is simple and cost-effective to apply, but provides several layers of protection against counterfeiters and includes anti-counterfeit and anti-diversion features. The unique mark according to the invention contains a product control code that is printed in invisible ink comprising a ultraviolet (UV) ink and an infrared (IR) ink. As used herein, "invisible" ink is ink that is not visible with the human eye when illuminated with light in the visible spectrum. UV or IR ink produces visible light when illuminated with a UV or IR light source, respectively.

A first layer of protection provided by the invention is invisibility of both the UV and IR inks. A second layer of protection is the product control code itself. A third layer of protection is the presence of the IR ink as part of the unique mark. A fourth layer of protection is the IR emitting characteristics of the IR ink.

Although an IR ink is used, the unique mark according to the invention requires only a small amount of up-converting phosphor in the IR ink to be effective, thereby keeping the costs to a minimum. This is because the invention predefines the location of the IR mark in relation to the UV mark and, as a result, permits the IR light source to be aimed and focused at a small spot, thereby enabling the IR light source to excite and cause even small amounts of up-converting phosphor to give off visible light. An added benefit of using a small of amount of up-converting phosphor in the IR ink is that the mark will probably go undetected under a diffuse IR light source.

Another object of the invention is to provide a method of applying the invisible code in a manner that is simple and cost-effective. In this method, the code is hot stamped onto a product label to affix the code onto the product label to be resistant against normal handling and usage of the product.

Still another object of the invention is to provide a method of validating a product containing a label with an authentication mark according to the invention. In this method, the label is exposed to UV light and a product control code is located and read. If the product control code is present and determined to be valid, an IR light is aimed at a location that has been predefined in relation to the product control code. The product is validated if, responsive to the IR light, a sparkle of a predetermined color is emitted at that location.

Additional objects, features and advantages of the invention will be set forth in the description of preferred embodiments which follows.

BRIEF DESCRIPTION OF THE DRAWINGS

The invention is described in detail herein with reference to the drawings in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
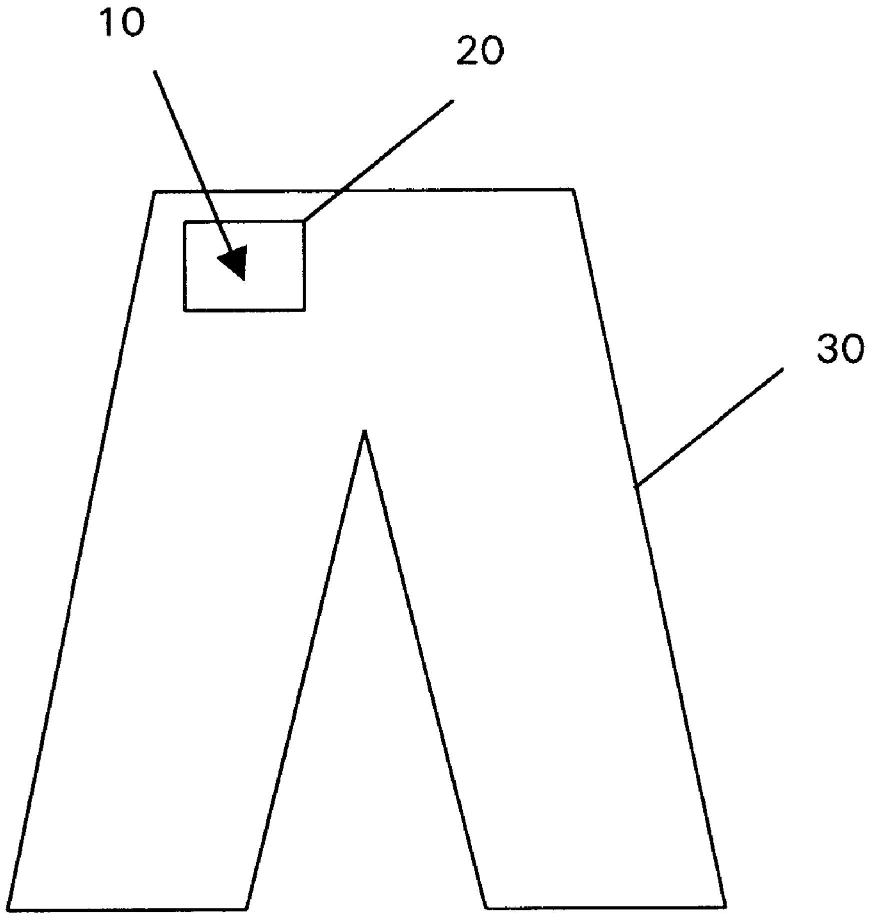
FIG. 1 illustrates a product containing a label with an authentication mark according to the invention.

FIG. 1 illustrates a product label containing an authentication mark according to the invention. In the example of FIG. 1, the authentication mark 10 (not shown because it is invisible under normal light) is applied onto a product label 20 that is affixed to a pair of pants 30. However, the authentication mark according to the invention is not limited to this example. The authentication mark according to the invention may be used to verify any product, and may be applied directly to a surface of the product or, as shown in the example, to the product label 20. Further, in the preferred embodiments, the authentication mark 10 is applied to a polyester label. Other substrates, e.g., a nylon substrate or a cotton substrate, may be used.

Figure 2:
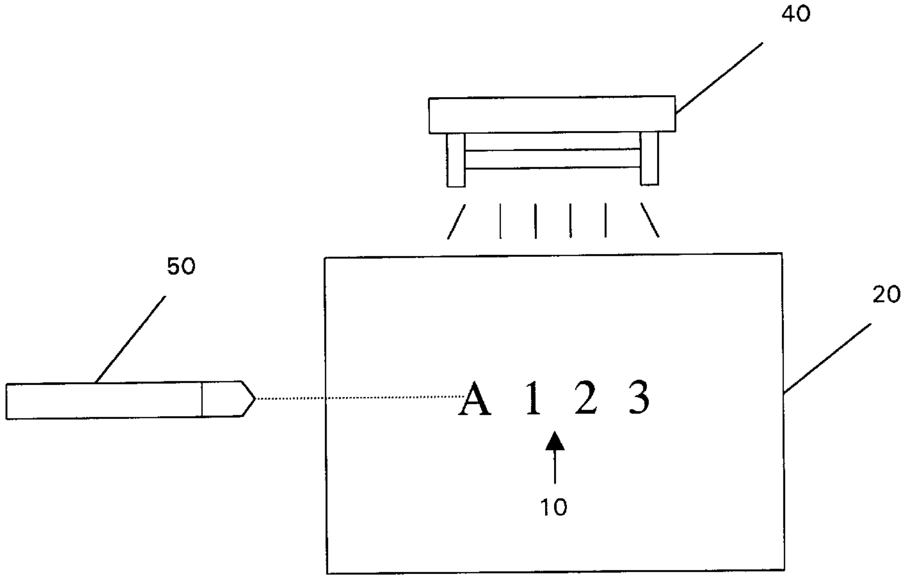
FIG. 2 is an enlarged view of the label having the authentication mark according to a first embodiment of the invention.
Figure 3:
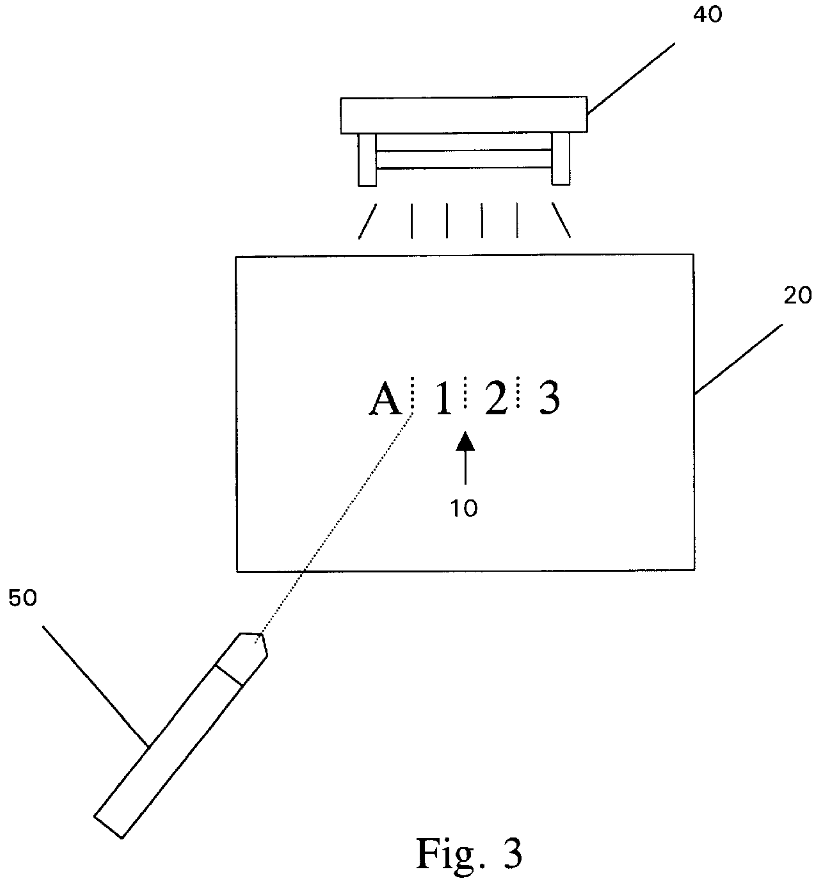
FIG. 3 is an enlarged view of the label having the authentication mark according to a second embodiment of the invention.

The authentication mark 10 is invisible to the naked eye under normal lighting conditions. However, as shown in FIGS. 2 and 3, the authentication mark 10 becomes visible when placed under an ultraviolet (UV) light source 40. This occurs because the authentication mark 10 contains a UV ink. The UV ink of the preferred embodiments may be any common UV ink, for example, an ink containing an organic down-converting phosphor which emits light in the visible spectrum when exposed to UV light.

Some UV inks are slightly visible in the visible light spectrum. This occurs because the visible light spectrum partially overlaps with the UV light spectrum. Thus, the UV ink of the preferred embodiments is selected so that it becomes visible only when it is exposed to UV light.

FIG. 2 illustrates an example of the authentication mark according to a first preferred embodiment. In FIG. 2, a product control code "A123" is revealed under the UV light source 40. The product control code is used for inventory control. For example, the letter "A" may be a year code, representing the year of manufacture, and the numeric "123" may be a country code, representing the intended market or destination for a product bearing this code.

The location of the infrared (IR) mark is determined in relation to the location of the product control code "A123." In the first preferred embodiment, the ink for printing the authentication mark 10 also contains an IR ink. Therefore, the location of the IR mark is the same as the location of the product control code. If any part of the code "A123" is exposed to a focused beam of infrared laser 50, as illustrated in FIG. 2, the exposed part of the code exhibits a sparkle. The sparkle results because the IR ink contains an up-converting phosphor that responds to an IR laser excitation by emitting light in the visible spectrum.

The up-converting phosphor is selected to provide two layers of protection against counterfeiting. First, the use of the up-converting phosphor in conjunction with a UV ink may be unknown to a counterfeiter. Therefore, counterfeit products that contain just the UV ink can be easily separated out from the genuine products. Second, the color of the sparkle can be chosen by a selection of the up-converting phosphor. The up-converting phosphor of the preferred embodiments is an up-converting phosphor "PTIR545" which is available from Phosphor Technology Ltd. and emits a green sparkle when excited by the IR laser 50.

Because up-converting phosphors are more costly to acquire than down-converting phosphors, only small quantities are used to form the authentication mark 10. For this reason, it is necessary that a concentrated laser source, like the IR laser source 50, be used as the IR light source when verifying whether the authentication mark 10 contains the requisite IR mark. In the preferred embodiments, the IR laser source 50 has a power output of about 200 mW. The power requirement can be adjusted down, of course, if a greater amount of up-converting phosphor is used in the IR ink. If, to the contrary, the IR light source generates a diffuse IR light, the IR mark will not fluoresce sufficiently to emit visible light in the amount that is detectable to the human eye.

FIG. 3 illustrates an example of the authentication mark according to a second preferred embodiment. The second preferred embodiment employs the same UV ink and IR ink as in the first embodiment. The composition of the authentication mark is however different in the second preferred embodiment. In the second embodiment, the authentication mark includes a first component containing the UV ink without the IR ink and a second component containing the IR ink without the UV ink.

In the second preferred embodiment, the product control code "A123" is printed with UV ink and is revealed under the UV light source 40. The IR mark is applied between the characters of the product control code, e.g., between A and 1, 1 and 2, and 2 and 3, in the form of a bar (shown as dotted lines in FIG. 3) and exhibits a sparkle when exposed to a focused beam of IR laser 50. The location of the IR mark is known only to the manufacturer's representatives and would normally be difficult to find, because a focused laser beam, which must be used since the authentication mark 10 contains only small quantities of IR ink, can illuminate only a small area at a time.

When the authentication mark 10 is applied to a label of a pair of pants as in the preferred embodiments, the application of the authentication mark 10 must be permanent enough to survive denim washing, stone washing, and enzyme washing that some types of pants, e.g., blue jeans, commonly undergo. However, many types of UV and IR ink printing processes cannot withstand such rigorous washing. To overcome the problem caused by rigorous washing, a hot stamping process may be used in the preferred embodiments of the invention applied to blue jeans.

A conventional hot stamping process is well known and includes the steps of printing an image on a transfer paper by a silk screen printing process, using a hot stamp ink, and then transferring the image formed on the transfer paper onto a final carrier by a hot stamping machine at an appropriate temperature, pressure and time. The transfer ink used for this purpose is generally composed of a thermoplastic resin as a binder resin, such as vinyl chloride-vinyl acetate copolymers, acrylic resins and polyesters.

Figure 4:
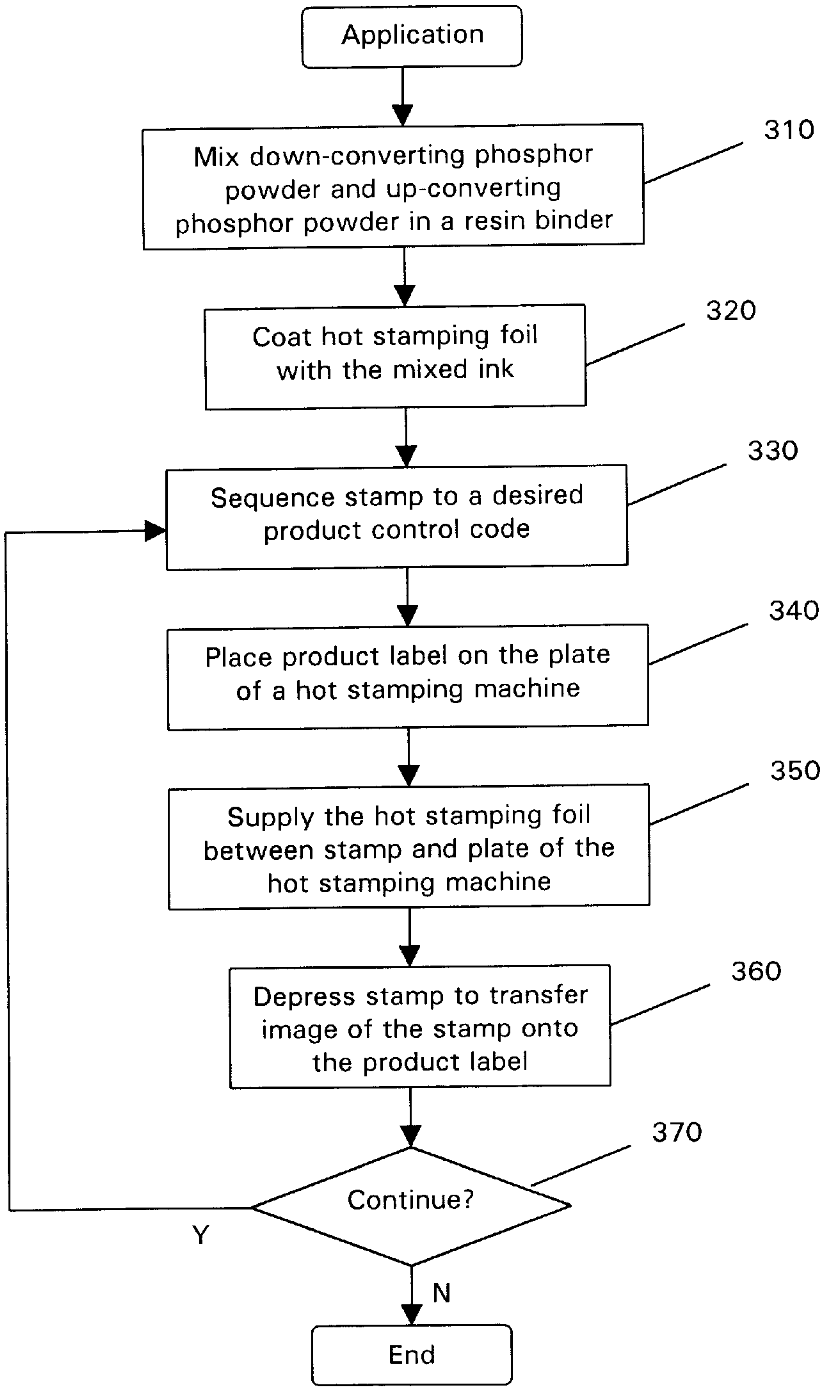
FIG. 4 illustrates the steps of applying the authentication mark according to the first preferred embodiment.

FIG. 4 illustrates the hot stamping process employed to produce the authentication mark according to the first preferred embodiment. In Step 410, a down-converting phosphor powder and an up-converting phosphor powder are mixed in a binder resin, which may be any acrylic or urethane resin that is thermoplastic, to form the ink for the authentication mark. The ratio of the down-converting phosphor powder to the up-converting phosphor powder that is used in the mixture is about 7:3 by weight, and the down-converting and up-converting phosphor powders comprise 10–20% by weight of the mixed ink. The preferred particle size of the down-converting and up-converting phosphor powders is between 1–2 microns, but can be as large as 3 microns.

In Step 420, the authentication mark ink is coated onto a hot stamping foil, which can be plastic, mylar, polypropylene, or polyester. The coating process that is used in the present invention is commonly known as the Gravure process, but other types of rod coating or flexo-coating may be used.

The stamp of the hot stamping machine used in this process includes an engraved portion by which the product label is imprinted. The engraved portion includes four separately adjustable sections, each of which can be sequenced through an alphabet A–Z or a number 0–9 so that an image of a desired product control code, e.g., "A123" or "B234," can be imprinted on the product label. In Step 430, the stamp is sequenced to the desired product control code. In Step 440, the product label is placed on the plate of the hot stamping machine, and in Step 450, the hot stamping foil is supplied between the stamp and the plate. The stamp is depressed in Step 460 and an imprint image is transferred onto the product label with the mixed ink. The hot stamping process is checked for completion in Step 470 and returns to Step 430 if the hot stamping process has not completed.

Alternative to the hot stamping process, an offset printing process may be used to apply the authentication mark 10 according to the invention. The offset printing process is also resistant to denim washing, but the hot stamping process is preferred because it provides sequencing of the product control code. In offset printing, by contrast, the plates must be changed every time a product control code is changed.

Another printing method that may be used to apply the authentication mark 10 according to the invention is thermal ribbon printing. Thermal ribbon printing may be used when the authentication mark 10 is applied to paper labels. However, for polyester and other fabric-based labels, thermal ribbon printing is not desired.

The hot stamping process employed to produce the authentication mark according to the second preferred embodiment is carried out in a similar manner, with the following modifications. First, the down-converting phosphor powder and the up-converting phosphor powder are separately mixed with the resin binder to produce UV ink and IR ink, respectively. Second, the hot stamping foil is coated with the UV ink at predetermined areas to produce UV bands corresponding to the location of imprinting code characters on the stamp and with the IR ink at predetermined areas to produce IR bands corresponding to the location of spaces between the imprinting code characters on the stamp. Third, the stamp of the hot stamping machine must include additional engravings to transfer the IR ink coated on the hot stamping foil onto the spaces between the characters of the product control code.

Figure 5:
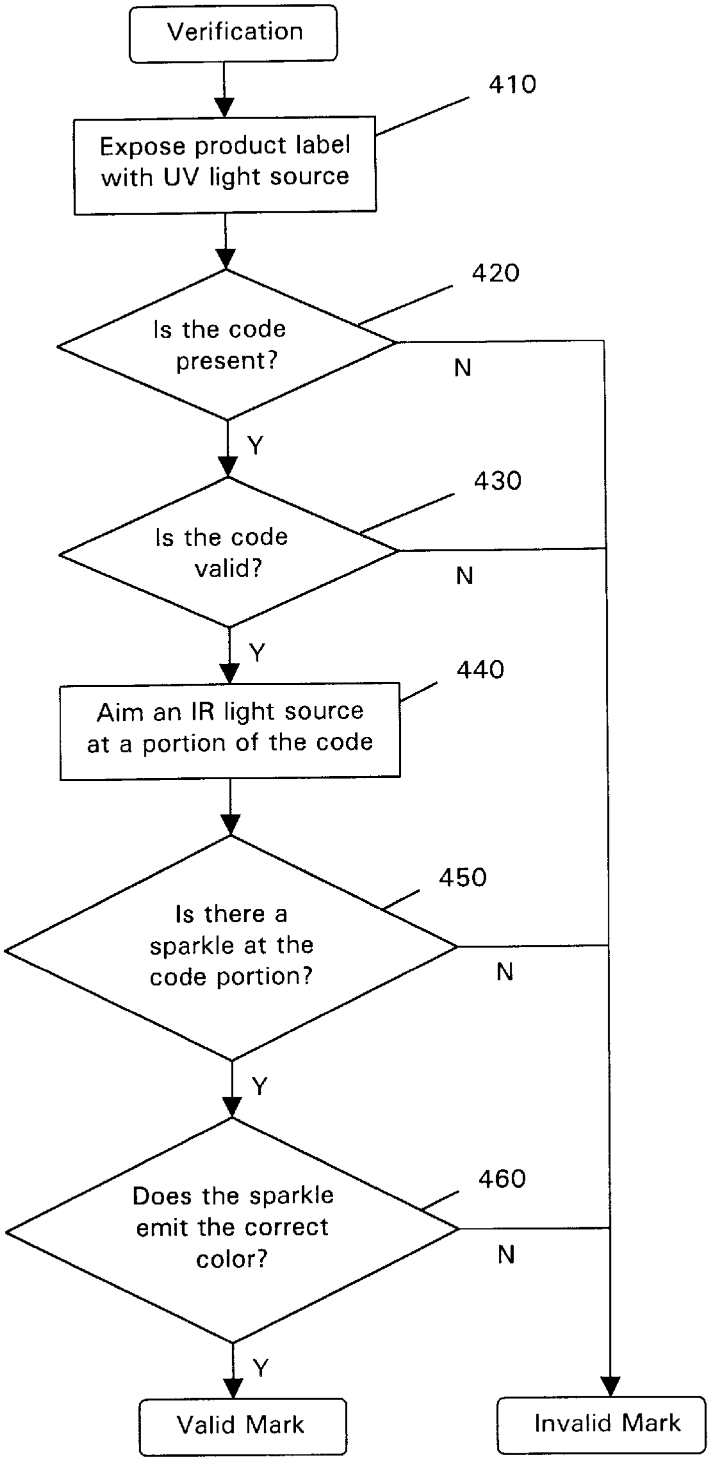
FIG. 5 illustrates the steps of identifying a product containing a label with the authentication mark according to the first preferred embodiment.

FIG. 5 illustrates the steps of identifying a product containing a label with the authentication mark according to the first preferred embodiment. In Step 510, a UV light source is turned ON to expose the product label surface. Once the presence of a product control code is verified (Step 520), the product control code is checked to see if it is valid (Step 530). The product control code is invalid, e.g., if there is no record of it or if the country code does not match the product's destination. If the product control code is valid, an IR laser light source is aimed at a portion of the product control code (Step 540). In Step 550, the emission of a sparkle is checked and in Step 560, the color of the sparkle is checked. If either the sparkle is not present or the color is incorrect, the examined product is deemed to be a counterfeit.

The process employed to identify the authentication mark according to the second preferred embodiment is carried out in a similar manner. The only differences are that the location for the IR mark is determined to be the spaces between the characters of the product control code, so the IR light source is aimed at these spaces, not at the product control code itself.

Another embodiment of the invention employs a plurality of IR marks which emit one or more different visible colors when illuminated with an IR light source. The IR ink may be contained in the product control code, as in the first preferred embodiment, or not, as in the second preferred embodiment. Also, the product control code may be other than alphanumeric characters as, for example, bar codes or manufacturer's proprietary special codes or markings.

As used herein and in the appended claims, a "code" in its most general sense is the combined UV and IR marks, which together may form a product control code that is used for inventory control, bar codes, manufacturer's proprietary special codes or markings, a symbol, geometric or fanciful shape, or a combination of these. For example, in the first preferred embodiment, the "code" includes the UV and IR marks that form the product control code. In the second preferred embodiment, the "code" is the combination of the UV mark that forms the product control code and the IR mark located between the characters of the product control code.

In the invention, the UV mark is preferably used to locate the IR mark, which is applied in a fixed or predetermined relationship with at least a portion of the UV mark. For example, the UV mark may be an open circle, and the IR mark may be a small dot in the center of the circle. In this case, the "code" is considered the combination of the circle and the dot. Further, even if the "code" is made up, as in the first preferred embodiment, of both UV and IR inks, such that the same indicia, symbol, geometric, or fanciful shape of both the UV and IR inks overlay one another, the "code" is defined as having both a UV portion and an IR portion.

While particular embodiments according to the invention have been illustrated and described above, it will be clear that the invention can take a variety of forms and embodiments within the scope of the appended claims.

I claim:

1. A product label comprising a code applied thereon, wherein the code is invisible under visible light and includes a UV ink to render the code visible and decipherable under UV light and an IR ink to render a part of the code to be visible under concentrated IR light said IR ink made visible by up-converting phosphor contained therein.

2. The product label according to claim 1, further comprising a polyester substrate, wherein the code is applied on the polyester substrate.

3. The product label according to claim 2, wherein the code is hot stamped onto the polyester substrate.

4. The product label according to claim 1, wherein the code comprises alphanumeric characters representing a product control code.

5. The product label according to claim 4, wherein the UV ink and the IR ink are contained in the product control code.

6. An authentication mark placed on a substrate comprising a code that is invisible under visible light, said code including a UV portion that is visible and decipherable when illuminated with UV light and an IR portion that is visible when illuminated with concentrated IR light said IR portion produced by IR ink containing up-converting phosphor, wherein positions of the UV and IR portions have been predefined relative to each other, and said substrate comprises a product label.

7. The authentication mark according to claim 6, wherein the UV and IR portions overlay one another.

8. The authentication mark according to claim 7, wherein the code comprises alphanumeric characters representing a product control code.

9. The authentication mark according to claim 1, wherein the product label comprises the polyester.

10. The authentication mark according to claim 9, wherein the code is applied to the product label using a hot stamping process.

11. A method of verifying an authenticity of a product, comprising the steps of:

exposing the product under a UV light source;

locating at least a portion of a code that is visible and decipherable under the UV light source said code having an IR portion, said IR portion produced by IR ink containing up-converting phosphor;

exposing IR portion of the code to a concentrated IR light; and confirming a light emission in response to the concentrated IR light.

12. The method according to claim 11, further comprising the step of confirming a color of the light emission.

13. The method according to claim 11, further comprising the step of confirming that the code is a valid code.

14. The method according to claim 13, wherein the step of confirming that the code is valid includes the step of matching the product destination with a country code contained in the code.

15. The method according to claim 11, further comprising the step of aiming the IR light in a predetermined relation to the location of the portion of the code.

16. The method according to claim 11, wherein the IR light is aimed at the location of the portion of the code.

17. The method according to claim 15, wherein the code comprises alphanumeric characters and the IR light is aimed at a space between two of the alphanumeric characters.

18. A product label comprising a mark applied thereon using ink containing a down-converting phosphor and an up-converting phosphor, wherein the mark is not visible when illuminated under visible light, and at least a portion of the mark is visible when exposed to a diffuse UV light source and wherein an amount of the up-converting phosphor is controlled so that another portion of the mark is visible when illuminated under a concentrated IR light source but is not visible under a diffuse IR light source.

19. The product label according to claim 18, wherein a ratio of the down-converting phosphor to the up-converting phosphor is about 7:3 by weight.

20. The product label according to claim 19, wherein the down-converting phosphor and the up-converting phosphor comprise 10–20% of the ink by weight.

* * * * *